(12) United States Patent
Masuda

(10) Patent No.: US 11,489,982 B2
(45) Date of Patent: Nov. 1, 2022

(54) PRINTER

(71) Applicant: TOSHIBA TEC KABUSHIKI KAISHA, Tokyo (JP)

(72) Inventor: Ken Masuda, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/179,067

(22) Filed: Feb. 18, 2021

(65) Prior Publication Data

US 2021/0400164 A1  Dec. 23, 2021

(30) Foreign Application Priority Data

Jun. 17, 2020 (JP) .............................. JP2020-104811

(51) Int. Cl.
| | | |
|---|---|---|
| *H04N 1/00* | (2006.01) | |
| *B41J 29/393* | (2006.01) | |
| *G07G 1/00* | (2006.01) | |
| *G07G 1/12* | (2006.01) | |
| *B41F 33/00* | (2006.01) | |

(52) U.S. Cl.
CPC ..... *H04N 1/00965* (2013.01); *B41F 33/0009* (2013.01); *B41J 29/393* (2013.01); *G07G 1/0018* (2013.01); *G07G 1/12* (2013.01)

(58) Field of Classification Search
CPC .............. H04N 1/00965; B41F 33/0009; B41J 29/393; G07G 1/0018; G07G 1/12
See application file for complete search history.

(56) References Cited

U.S. PATENT DOCUMENTS

| | | | |
|---|---|---|---|
| 2008/0012960 A1* | 1/2008 | Uchiyama ............ | H04N 1/2112 348/231.2 |
| 2011/0231607 A1* | 9/2011 | Gao ..................... | G06F 21/6218 711/E12.001 |
| 2014/0093258 A1* | 4/2014 | Thacker ............... | B41J 2/17546 399/27 |
| 2019/0358962 A1* | 11/2019 | Lee ...................... | B41J 2/33515 |
| 2020/0201527 A1* | 6/2020 | Nakajima ............. | G06T 11/206 |

FOREIGN PATENT DOCUMENTS

JP 2007276362 A 10/2007

OTHER PUBLICATIONS

English machine Translation for JP2007276362 (Year: 2007).*

* cited by examiner

*Primary Examiner* — Iriana Cruz
(74) *Attorney, Agent, or Firm* — Kim & Stewart LLP

(57) ABSTRACT

According to an embodiment, a printer includes a printer unit configured to print images on paper, a connector connectable to a detachable storage medium, and a controller. The controller is configured to acquire time information from the storage medium when the storage medium is connected to connector, and then store output information in the storage medium. The output information includes device information related to a print function of the printer unit and the acquired timing information in association with each other. The printer may lack an internal clock yet still output information associated with time information.

14 Claims, 8 Drawing Sheets

FIG. 4

| Product information | Model name |
| --- | --- |
| | Serial number |
| | Manufacture date |
| | . . . |
| Maintenance information | Setting information |
| | Number of issued sheets |
| | Print job history |
| | Error information |
| | Thermal head temperature history |
| | . . . |

PRINTER

CROSS-REFERENCE TO RELATED APPLICATIONS

This application is based upon and claims the benefit of priority from Japanese Patent Application No. 2020-104811, filed on Jun. 17, 2020, the entire contents of which are incorporated herein by reference.

FIELD

Embodiments described herein relate generally to a printer and a control program for a printer.

BACKGROUND

Conventionally, in a printer such as a thermal printer, for a service person to perform maintenance or a maintenance inspection related to a print function of the printer, information must be acquired from the printer. A technique is known by which a service person connects a USB (Universal Serial Bus) memory drive to a printer to acquire the relevant maintenance information.

When the USB memory is connected to the printer, the printer reads out various maintenance information stored in an internal storage unit, creates an output file containing the maintenance information, and then stores the created output file on the USB memory drive. At this time, the printer also records the generation time, such as the creation date and time, in the output file by using a clock function included in the printer (sometimes referred to as an internal clock). That is, the printer stores the output file with the maintenance information along with the information indicating the generation time of the output file in the USB memory drive in association with each other. The service person can analyze errors or faults in the printer using maintenance information in the output file, and can manage the acquired maintenance information based on the generation time associated with the output file.

In recent years, there has been an increasing demand for inexpensive printers, and some such inexpensive printers have no internal clock function. For such a printer, the printer's control unit cannot store the generation time in the output file with the maintenance information. Furthermore, since the storage medium, such as a USB memory drive, to be connected to the printer also does not have a clock function, the control unit of the printer cannot use the clock function of the storage medium as an alternative to an internal clock. However, it is still desired that device information, such as maintenance information, be stored in association with time information (e.g., creation time or output time) in the storage medium, even when the printer lacks an internal clock function.

BRIEF DESCRIPTION OF THE DRAWINGS

FIG. 4 is a diagram illustrating a data configuration of a device information area in a storage unit according to an embodiment.

DETAILED DESCRIPTION

In general, according to one embodiment, a printer includes a printer unit configured to print images on paper, a connector connectable to a detachable storage medium, and a controller. The controller is configured to acquire time information from the storage medium when the storage medium is connected to connector, and store output information in the storage medium. The output information includes device information related to a print function of the printer unit and the acquired timing information in association with each other.

Hereinafter, a printer according to an embodiment will be described with reference to the drawings. In the present disclosure, a thermal printer that performs printing by heat generation of a thermal head (thermal printhead) will be described as an example of a printer. However, the printer is not limited to this.

Figure 1:
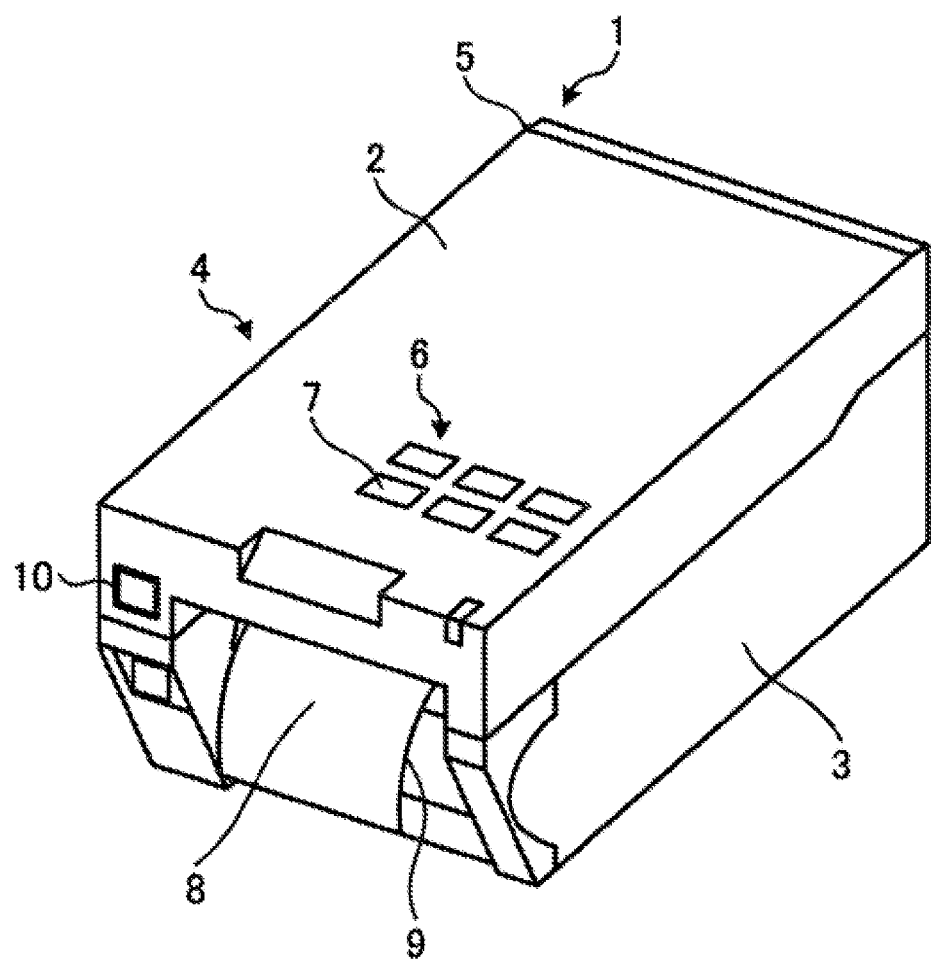
FIG. 1 is a perspective view showing an example of a printer according to an embodiment.

FIG. 1 is a perspective view showing an example of an external appearance of a thermal printer 1. The thermal printer 1 can be connected to a host device. The thermal printer 1 receives print data from the host device and performs printing accordingly. In the present embodiment, the thermal printer 1 is a component in a point of sales (POS) terminal. The thermal printer 1 prints a receipt based on transaction information received from the POS terminal.

The thermal printer 1 includes a device body 4 including an upper housing 2 and a lower housing 3. The upper housing 2 is rotatably provided (e.g., hinged) on the lower housing 3 with one end side 5 as a rotation axis. When the upper housing 2 is rotated from the closed state shown in FIG. 1, the inside of the thermal printer 1 is exposed. An operation unit 6 is provided on the upper surface of the upper housing 2. The operation unit 6 includes a plurality of operation buttons 7. The operation unit 6 receives operator instructions (user inputs) for the thermal printer 1 from a user/operator and outputs various instructions according to the received input operations. For example, manipulation of the operation unit 6 can cause the thermal printer 1 to turn the power supply on or off. For example, the operation unit 6 can supply an instruction to output device information to a USB memory 100 that can be connected to the device body 4 (see FIGS. 5 and 6).

The thermal printer 1 has an issue port 8. The issue port 8 discharges a printed receipt 9 from the thermal printer 1 to the outside. The thermal printer 1 includes a USB connection port 10. The USB connection port 10 permits the attachment (and subsequent detachment) of a device conforming to a USB standard, such as the USB memory 100. The USB connection port 10 is an example of a connection unit to which a storage medium can be detachably connected.

Figure 2:
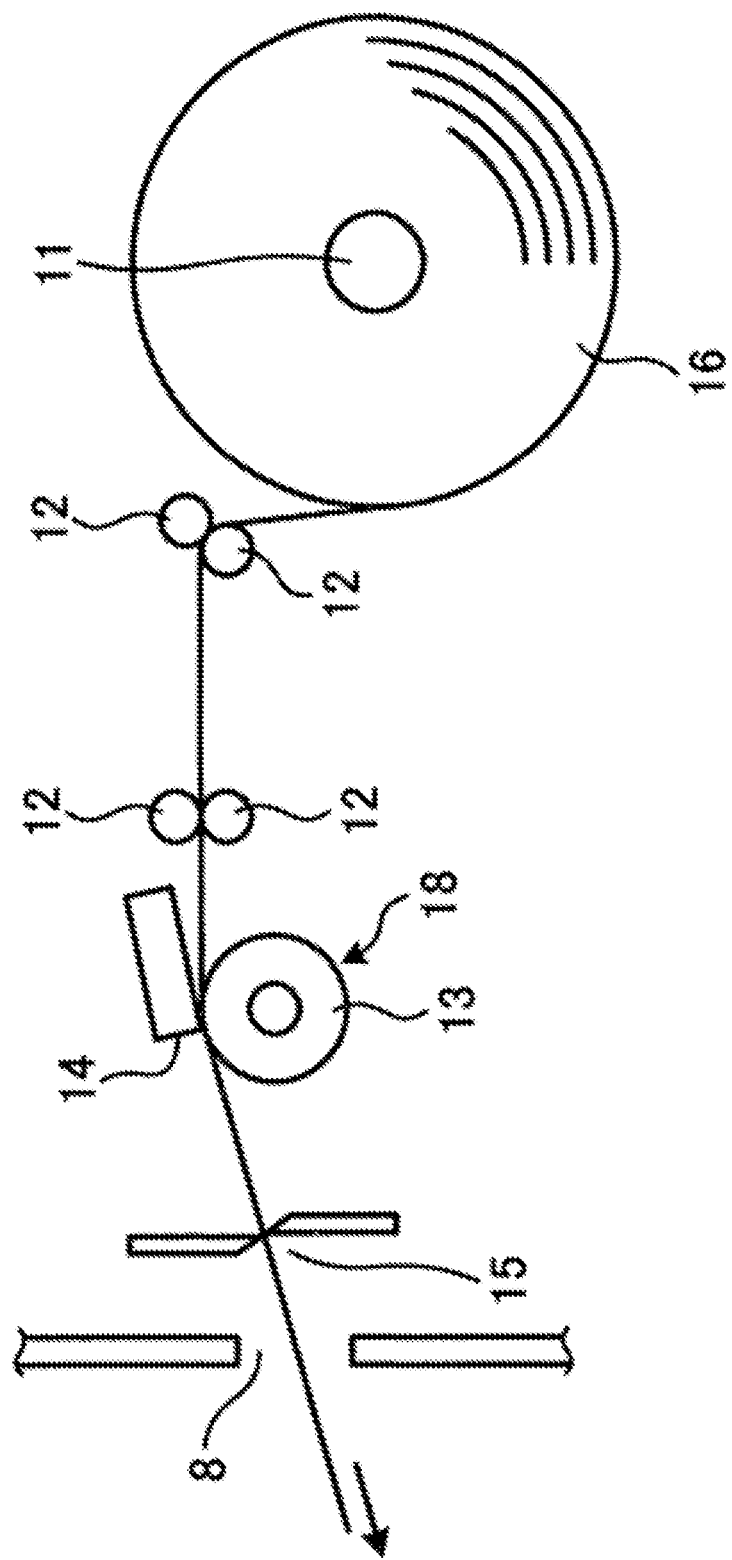
FIG. 2 is a diagram schematically showing an internal configuration of a printer according to an embodiment.

FIG. 2 is a schematic internal structure of the thermal printer 1. As shown in FIG. 2, the thermal printer 1 includes therein a holding unit 11, a plurality of guide rollers 12, a platen roller 13, a thermal head 14, a cutter 15 (including a pair of blades), and the like.

The holding unit 11 holds a thermal paper 16 wound in a roll shape. The thermal paper 16 can rotate about an axis of the holding unit 11 to permit the thermal paper 16 to unspool for printing. The guide rollers 12 guide the thermal paper 16 unwound from the holding unit 11 to travel between the platen roller 13 and the thermal head 14. Two pairs of the guide rollers 12 are provided in the conveyance path from the holding unit 11 to between the platen roller 13 and the thermal head 14.

The platen roller 13 rotates by operation of a conveyance motor 17 (see FIG. 3) with the thermal paper 16 sandwiched between the platen roller 13 and the thermal head 14.

The conveyance motor 17 is, for example, a stepping motor.

The thermal head 14 is a linear thermal head in which a plurality of heat sources are provided in a line along the direction intersecting (orthogonal in the present embodiment in FIG. 2) the conveyance direction of the thermal printer (the direction perpendicular to the paper surface in FIG. 1). The thermal head 14 is urged (pressed) toward the platen roller 13 with a predetermined pressing force. The thermal head 14 performs printing on the thermal paper 16 that is conveyed by the conveyance motor 17. The printing is performed by selectively heating the heat sources and applying thermal energy to the thermal paper 16 accordingly as it passes the thermal head 14. The platen roller 13 and the thermal head 14 together form a printing unit 18 for printing on the thermal paper 16. The thermal head 14 includes a temperature sensor 19 (see FIG. 3) formed of a thermistor or the like. The heating time (time on) of the heat source in the thermal head 14 is controlled according to the detected temperature by the temperature sensor 19. A history of temperatures detected by the temperature sensor during printing (hereinafter also referred to as a temperature history) is stored in a device information section 43 (see FIG. 3) of the thermal printer 1.

The cutter 15 is formed by combining a flat plate-shaped fixed blade and a movable blade having a similar shape. The cutter 15 can cut the conveyed thermal paper 16 at any arbitrary position along the length of the passing thermal paper 16 by sliding the movable blade with respect to the fixed blade. In FIG. 2, the fixed blade is disposed on the upper side in the drawing, and the movable blade is disposed on the lower side in the drawing. The movable blade is driven by a cutter motor 20 (see FIG. 3) to be movable in the vertical direction in FIG. 2. The movable blade is normally positioned at a lower position and moves upward the along the width of the thermal paper 16 when cutting the thermal paper 16. The thermal paper 16 cut by the cutter 15 is then issued as a receipt 9 from the issue port 8.

Figure 3:
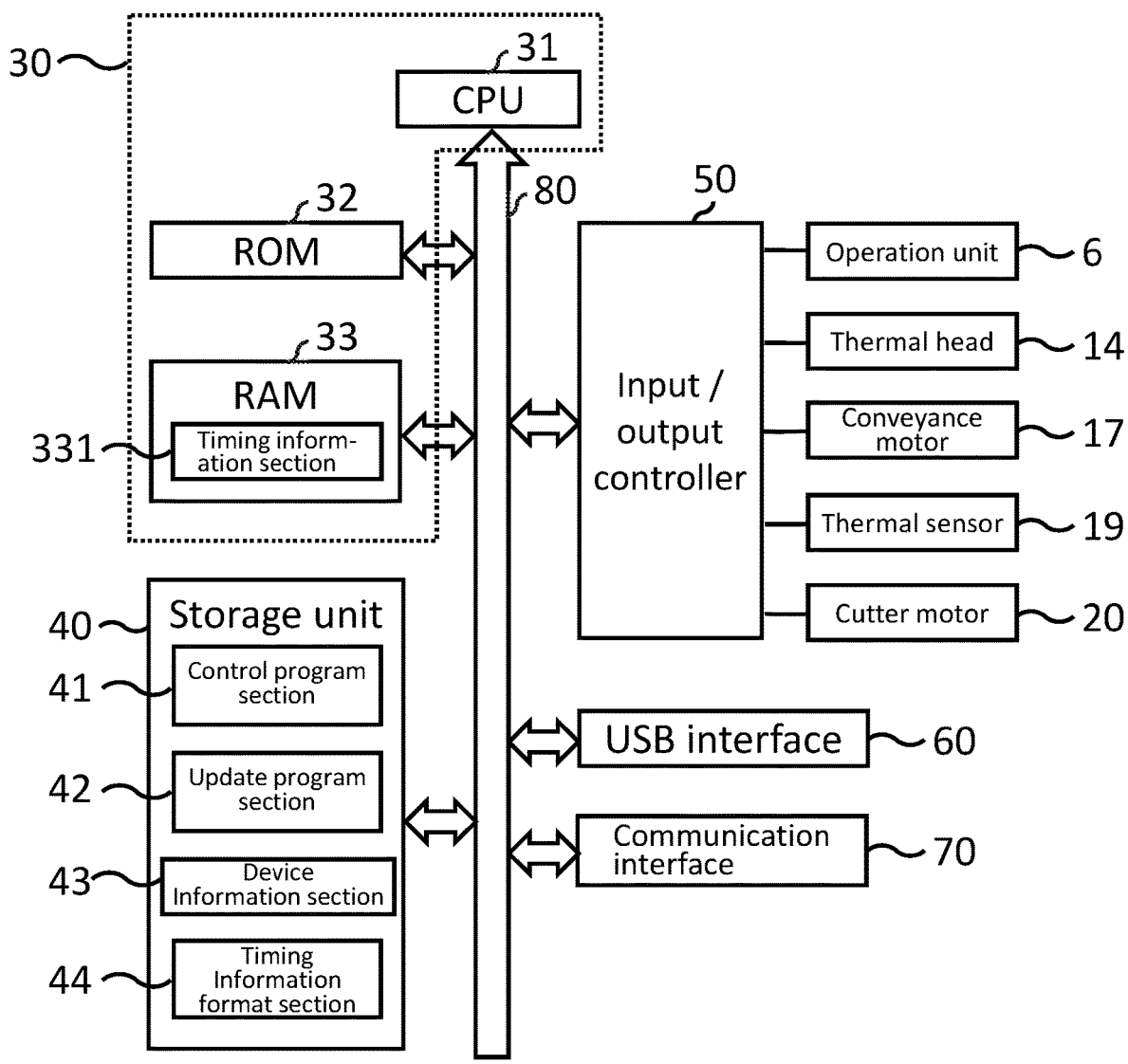
FIG. 3 is a block diagram showing a hardware configuration of a printer according to an embodiment.

Next, a hardware configuration of the thermal printer 1 will be described. FIG. 3 is a block diagram configuration of the thermal printer 1. The thermal printer 1 includes a control unit 30, a storage unit 40, an input/output controller 50, a USB interface 60, and a communication interface 70. The control unit 30, the storage unit 40, the input/output controller 50, the USB interface 60, and the communication interface 70 are connected to one another via a bus 80.

The control unit 30 comprises, for example, a computer including a CPU (Central Processing Unit) 31, a ROM (Read Only Memory) 32, and a RAM (Random Access Memory) 33. The CPU 31, the ROM 32, and the RAM 33 are connected to each other via a bus 80. The control unit 30 may be referred to as a controller or the like.

The CPU 31 controls the overall operation of the thermal printer 1. The ROM 32 stores programs and various data related to operations of the thermal printer 1, such as firmware of the thermal printer 1. The RAM 33 includes a timing information section 331. The timing information section 331 stores timing information read from a storage medium, such as the USB memory 100 (see FIGS. 5 and 6), connected to the USB connection port 10. The timing information is information indicating a time, for example, information indicating the time on a per year basis such as 2020, information indicating the time on a per month basis such as January 2020, information indicating the time a per day basis such as Jan. 1, 2020, information indicating the time on a per hour basis such as Jan. 1, 2020 1:00, information indicating the time on a per minute basis such as Jan. 1, 2020 1:01, and information indicating the time on a per second basis such as Jan. 1, 2020 1:01:01. The timing information may indicate time in a finer unit scale than a per second basis in some examples. The unit scale at which the timing information represents time can be set as appropriate. The RAM 33 is used as a work area of the CPU 31, and various programs and various types of information stored in the ROM 32 and the storage unit 40 can be loaded on the RAM 33. The control unit 30 executes various control processes of the thermal printer 1 by making the CPU 31 operate in accordance with a control program which is stored in the ROM 32 or the storage unit 40 and loaded on the RAM 33.

The storage unit 40 includes a storage device such as an HDD (Hard Disk Drive) or an SSD (Solid State Memory). The storage unit 40 includes a control program section 41, an update program section 42, a device information section 43, and a timing information format section 44. The control program section 41 stores various control programs in addition to a control program for functioning as the thermal printer 1.

The update program section 42 stores an update program downloaded from the outside via the USB interface 60 or the communication interface 70. The update program is a program for updating software such as firmware stored in the ROM 32 or a control program stored in the control program section 41. Hereinafter, the software updated by the update program is also referred to as a program.

The device information section 43 stores information related to components or sub-devices included in the thermal printer 1. Specifically, the device information section 43 stores information (device information) related to the print function of the printing unit 18. FIG. 4 is a diagram illustrating a data configuration of the device information section 43. The device information section 43 stores product information and maintenance information as device information.

The product information includes, for example, information indicating a model name, a serial number, date of manufacture of the thermal printer 1. The product information is stored at the time of product shipment. The model name is the name of the model of the thermal printer 1. The serial number is a number determined for each individual thermal printer. The date of manufacture is the date on which the thermal printer 1 was manufactured. Since a user such as a service person may use the product information when performing maintenance, the product information can also be referred to as a part of the maintenance information.

The maintenance information is information that can be used when a user or the like performs maintenance on the thermal printer 1. Specifically, the maintenance information is information indicating settings related to the operation of the printing unit 18, the operation history of the printing unit 18, and the like. The maintenance information is generally information stored subsequent to product shipment, and includes, for example, information indicating setting information, the number of sheets to issued, print job history, error information, thermal head temperature history, and the like. The maintenance information may be referred to, and/or include, an operation log, a use log, a status log, a history file, or the like.

The setting information includes an IP address, a language to be used, and a paper size, which are set when the thermal printer 1 is used. The number of issued sheets is the number of receipts issued by the thermal printer 1, and is updated each time a receipt is printed. The print job history is a history of jobs printed by the thermal printer 1, and is updated each time a print job is executed. The error information is the content of an error (e.g., an error code or the like) that has occurred in the thermal printer 1, such as a communication error with the POS terminal or a malfunction of the thermal head 14, and is updated each time an error occurs. The thermal head temperature history is a history of temperatures detected by the temperature sensor 19 during printing, and is updated each time a print job is executed.

Returning to FIG. 3, the timing information format unit 44 stores a format that can be for extracting timing information from a storage medium connected to the USB connection port 10. In the present embodiment, the format is for indicating time in increments of seconds, and includes date and time in a format of "yyyy-mm-dd-hh-mm-ss". In this format, from left to right, the first four digits indicate the Christian calendar year, and the next two digits each indicate the month, day, hour, minute, and second.

The input/output controller 50 is connected to the operation unit 6, the thermal head 14, the conveyance motor 17, the temperature sensor 19, and the cutter motor 20. The input/output controller 50 has a function as an input/output interface for connected hardware and a function for controlling the hardware. Thus, the control unit 30 can transmit and receive information (data) to and from the operation unit 6, the thermal head 14, the conveyance motor 17, the temperature sensor 19, and the cutter motor 20 via the input/output controller 50, and can control these hardware components based on instructions from the control unit 30.

The USB interface 60 connects to a device, such as the USB memory 100, conforming to a USB standard that is connected to the USB connection port 10. The control unit 30 can transmit and receive information (data) to and from the USB memory 100 via the USB interface 60. The communication interface 70 in this example is connected to a POS terminal or other host device. Thus, the control unit 30 can transmit and receive information (data) to and from the POS terminal (or other host device) via the communication interface 70.

Figure 5:
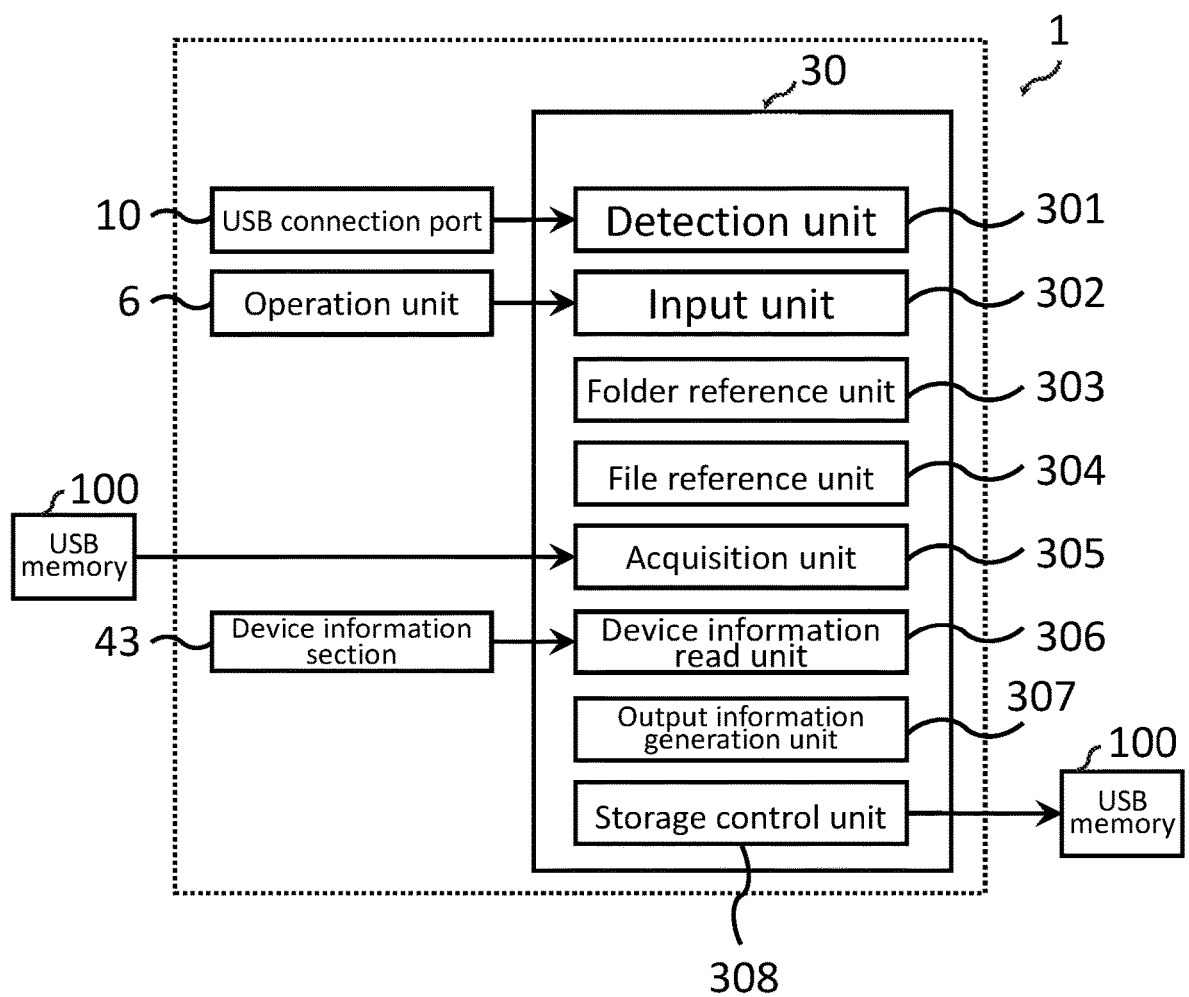
FIG. 5 is a block diagram showing a functional configuration of a printer according to an embodiment.

FIG. 5 is a block diagram illustrating an example of a functional configuration of the thermal printer 1. The control unit 30 by executing a control program or the like functions in conjunction with the other components of the thermal printer 1 as a detection unit 301, an input unit 302, a folder reference unit 303, a file reference unit 304, an acquisition unit 305, a device information read unit 306, an output information generation unit 307, and a storage control unit 308. That is, in this example, the CPU 31 of the control unit 30 operating according to a control program stored in the ROM 32 or the control program section 41 (and/or the update program section 42) of the storage unit 40 performs the functions described for the various functional units depicted in FIG. 5.

The detection unit 301 detects that the USB memory 100 is connected to the USB connection port 10 based on a detection signal from the USB connection port 10. The detection unit 301 detects also that the USB memory 100 is removed from the USB connection port 10 based on a detection signal from the USB connection port 10.

The input unit 302 receives an instruction to output device information to a storage medium. Specifically, the input unit 302 receives, from the operation unit 6, an instruction to output device information to the USB memory 100 that has been connected to the USB connection port 10. When the detection unit 301 detects connection of the USB memory 100, the input unit 302 may receive an output instruction from the detection unit 301. That is, the output instruction may be input immediately (automatically) after the detection unit 301 detects connection of the USB memory 100.

The folder reference unit 303 operates when the connection of the USB memory 100 to the USB connection port 10 is detected by the detection unit 301 and an instruction to output device information is input to the input unit 302. The folder reference unit 303 accesses the USB memory 100 connected to the USB connection port 10, refers to the folder name of the folder stored in the USB memory 100, and recognizes the folder name as timing information. In addition, the folder reference unit 303 accesses the USB memory 100 connected to the USB connection port 10, refers to an update time of the folder stored in association with the folder stored in the USB memory 100, and recognizes the update time as timing information. The update time stored in association with the folder was recorded based on a clock function of a PC (Personal Computer) or the like when the folder in the USB memory 100 was previously being updated by the PC or the like. The folder reference unit 303 may also or instead refer to the generation (creation) time of the folder stored in association with the folder stored in the USB memory 100. Such a generation time or update time of the folder may be stored/created as an attribute of the folder according to a file operating/management system of the PC or the like.

Similar to the folder reference unit 303, the file reference unit 304 operates when the detection unit 301 detects a connection of the USB memory 100 to the USB connection port 10 and the input unit 302 receives an instruction to output device information. The file reference unit 304 accesses the USB memory 100 connected to the USB connection port 10, and refers to an update time of a file stored in the USB memory 100 to recognize the update time of the file as timing information. The update time stored in association with the file is recorded based on the clock function of a PC or the like when the file is updated by the PC or the like. The file reference unit 304 may also or instead recognize the timing information by referring to a generation (creation) time stored in association with the file in the USB memory 100. Such a generation time or update time of the file may be stored/created as an attribute of the file according to a file operating/management system of the PC or the like. The file reference unit 304 can also or instead access the USB memory 100 connected to the USB connection port 10 and recognize the file name of a file stored in the USB memory 100 as the timing information by referring to the file name.

An acquisition unit 305 acquires timing information indicating a time from a storage medium connected to a connection unit. Specifically, the acquisition unit 305 acquires the timing information recognized by the folder reference unit 303 and/or the file reference unit 304 from the USB memory 100 connected to the USB connection port 10 and stores the timing information in the timing information section 331 of the RAM 33. Certain methods by which the acquisition unit 305 acquires timing information from the USB memory 100 are described below. In general, the acquisition unit 305 can acquire the timing information from the USB memory 100 by using any of these acquisition methods alone or in combination.

As a first acquisition method, the acquisition unit 305 can acquire timing information by accessing a timing information storage area of a predetermined storage medium. The timing information storage area can be freely set by a user. This is an area where data can be written. For example, an area storing the name of the uppermost folder (e.g., a top level folder/location in a hierarchal storage arrangement, sometimes referred to as a "root" folder or "root" location) stored in the USB memory 100 is set as the timing information storage area, and the acquisition unit 305 can acquire the timing information by reading the folder name of the uppermost folder stored in the USB memory 100. However, the timing information storage area can be set in any storage area of the USB memory 100 and need not necessarily be the uppermost folder.

As a second acquisition method, when the acquisition unit 305 recognizes that at least one of the folder name of the folder and the file name of the file stored in the storage medium indicates the timing information, the acquisition unit 305 can acquire the folder name or the file name as the timing information. For example, first, the folder reference unit 303 or the file reference unit 304 refers to the folder name of the folder or the file name of the file stored in the USB memory 100, and checks whether or not the folder name or the file name is stored in a format matching the format stored in the timing information format section 44 of the storage unit 40.

If the referenced folder name or file name matches the format stored in the timing information format section 44, the acquisition unit 305 acquires the folder name or file name as the timing information. When there are a plurality of folder names or file names that can be recognized as the timing information, the acquisition unit 305 acquires a folder name or a file name that corresponding to the latest time (e.g., a most recent file or folder).

As described above, since the format stored in the timing information format section 44 indicates time in seconds, the acquisition unit 305 can determine the latest timing information according to the rule of this format. The acquisition unit 305 can also acquire information based on only the folder name referred to by the folder reference unit 303. Similarly, the acquisition unit 305 can acquire the timing information based on only the file name referred to by the file reference unit 304. Alternatively, the acquisition unit 305 may refer to a folder name or a file name to recognize that the information is timing information. That is, the acquisition unit 305 may have the functions of the folder reference unit 303 and the file reference unit 304.

As a third acquisition method, the acquisition unit 305 can acquire the latest update time among all the update times of the folders or files stored in the storage medium (USB memory 100) as the timing information. The update time of the folder or file stored in the storage medium is an update time recorded based on a clock function of the PC or the like when the folder or file is updated by the PC or the like.

In the third acquisition method, for example, the folder reference unit 303 and the file reference unit 304 refer to the update time of the folder or file stored in the USB memory 100. The acquisition unit 305 can thus acquire the latest one of these update times as the timing information. The acquisition unit 305 can also acquire timing information based only on the update time of the folder referred by the folder reference unit 303. Similarly, the acquisition unit 305 can acquire timing information based on only the update time of the file referred by the file reference unit 304. The acquisition unit 305 may refer to the update time of the folder or the file. As in the case described in the second acquisition method, the acquisition unit 305 may have the functions of the folder reference unit 303 and the file reference unit 304.

When connection of the USB memory 100 to the USB connection port 10 is detected by the detection unit 301 and an instruction to output device information is input to the input unit 302, the device information read unit 306 reads the device information stored in the device information section 43 of the storage unit 40.

The output information generation unit 307 generates output information in which device information and timing information are associated with each other. Specifically, the output information generation unit 307 generates the device information read by the device information read unit 306 as an output file, and also stores the timing information acquired by the acquisition unit 305 (and stored in the timing information section 331) as the generation time (or update time) of the output file. The output file is an example of output information and may include a plurality of files.

The storage control unit 308 stores the output information in which the device information related to the print function of the printing unit 18 and the timing information acquired by the acquisition unit 305 are associated with each other in the storage medium connected to the connection unit. Specifically, the storage control unit 308 stores the output file generated by the output information generation unit 307 in a predetermined area of the USB memory 100. The operation of storing data in the storage unit 40, the USB memory 100, or the like may be referred to as writing.

Figure 6:
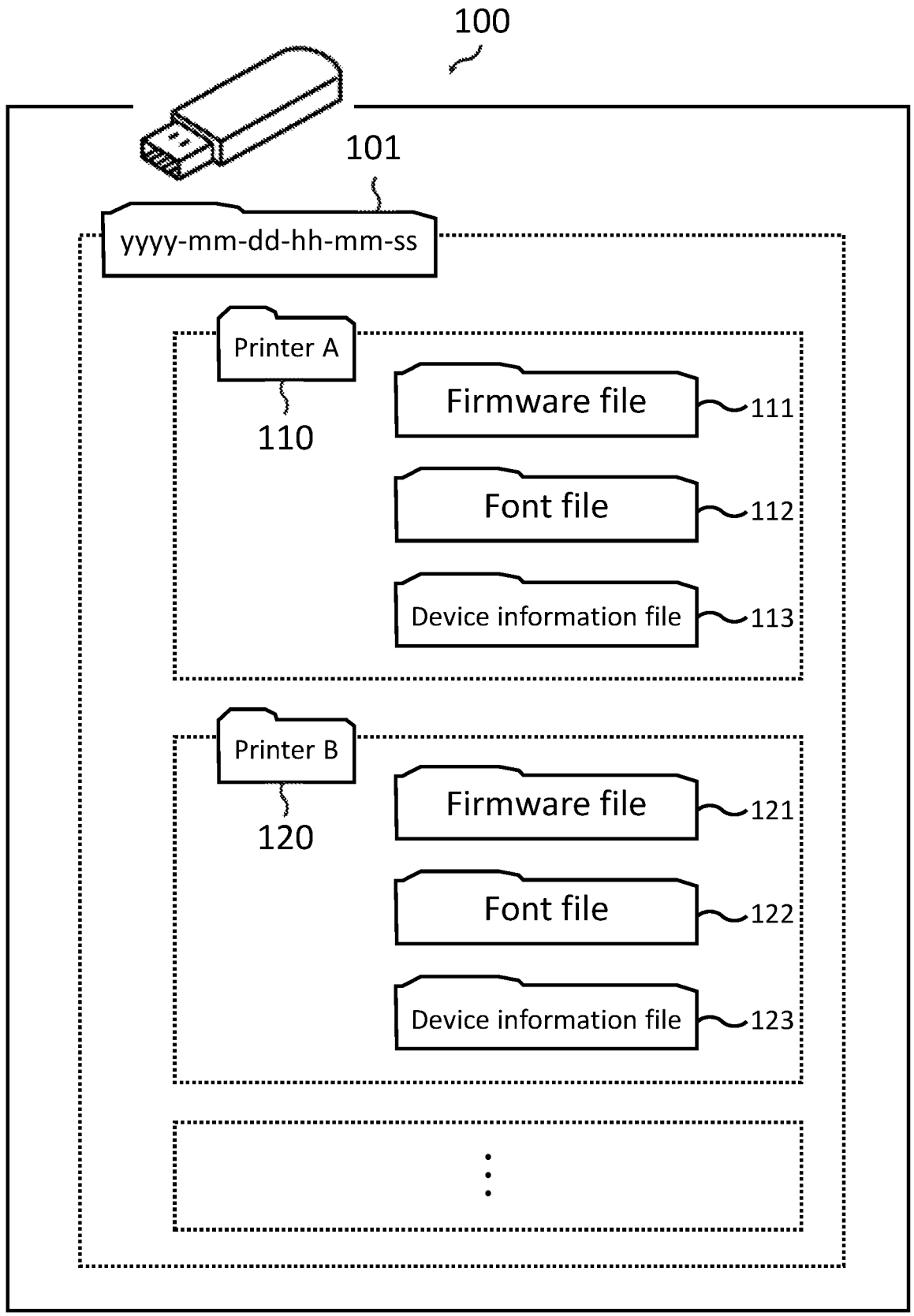
FIG. 6 is a diagram illustrating a data configuration of a USB memory drive according to an embodiment.

Next, the configuration of the USB memory 100 will be described. FIG. 6 is a diagram illustrating a data configuration of the USB memory. The USB memory 100 stores an integrated folder 101, which is an uppermost folder (root folder). In this example, the integrated folder 101 is the root folder of the USB memory 100. However, in other examples, a file may be stored outside the integrated folder 101.

The area for storing the folder name of the integrated folder 101 is an example of a timing information storage area of a predetermined storage medium. The folder name of the integrated folder 101 can be arbitrarily set by a user, and for example, information indicating the date on which the device information of the thermal printer 1 is acquired is set. The folder name of the integrated folder 101 is in the format "yyyy mm-dd-hh-mm-ss" as in the format stored in the timing information format section 44. That is, the folder name of the integrated folder 101 includes, from the left, a four-digit number yyyy representing the Christian calendar year, a two-digit number mm representing the month, a two-digit number dd representing the day, and a two-digit number hh representing the hour, a two-digit number representing minutes mm, and a two-digit number representing seconds ss. The folder reference unit 303 of the thermal printer 1 refers to a folder name of the integrated folder 101, thereby, this folder name can be recognized as timing information indicating timing. The predetermined timing information area of the storage medium is not limited to the storage area of the folder name of the integrated folder 101, and can be set in an arbitrary storage area.

The folder name of the integrated folder 101 can be stored by an arbitrary method. As an example, the folder name of the integrated folder 101 is first written using a PC or the like by the user who later connects the USB memory 100 to the thermal printer 1.

The integrated folder 101 includes a plurality of printer folders. In FIG. 6, although only a printer A folder 110 and a printer B folder 120 are illustrated, the integrated folder 101 can also include printer folders in addition to those. The printer folder is provided for each model of the thermal printer 1. The printer A folder 110 stores information corresponding to a model A, and the printer B folder 120 stores information corresponding to a model B.

The printer A folder 110 includes a firmware file 111, a font file 112, and a device information file 113. The printer B folder 120 includes a firmware file 121, a font file 122, and a device information file 123. Since the printer A folder 110 and the printer B folder 120 have the same folder structure, the printer A folder 110 will be described below as representative of both, and the printer B folder 120 will not be otherwise described.

The firmware file 111 stores a firmware update program stored in the thermal printer 1. The firmware file 111 is downloaded to the thermal printer 1 connected to the USB memory 100 and stored in the update program section 42 of the storage section 40. The download of the firmware file 111 to the thermal printer 1 can be executed as necessary.

The font file 112 stores images of characters printed by the thermal printer 1. The font file 112 is downloaded to the thermal printer 1 and stored in the storage unit 40. The download of the font file 112 is executed at the start of use of the thermal printer 1, and is executed as necessary subsequently. The information of the downloaded font file 112 includes, for example, the information indicating the used language and can be stored in the device information section 43 as a part of the setting information.

The output information of the thermal printer 1 is stored in the device information file 113 by the storage control unit 308 of the thermal printer 1. Specifically, the output file generated by the output information generation unit 307 is written into the device information file 113 by the storage control unit 308 of the thermal printer 1.

As described above, the firmware file 111 and the font file 112 are initially written/recorded by a PC or the like connected to the USB memory 100 prior to the connection of the USB memory 100 to the thermal printer 1. The update time of the firmware file 111 and the font file 112 is stored in seconds based on the clock function of the PC or the like. On the other hand, the device information file 113 is written by the thermal printer 1 to the USB memory 100. Since the thermal printer 1 does not itself have a clock function, the timing information stored in the timing information section 331 is stored as the update date and time for the device information file 113.

As possible scenarios, when the USB memory 100 having the above-described configuration is connected to the thermal printer 1, there is a case where the firmware file 111 is downloaded to the thermal printer 1, a case where the font file 112 is downloaded to the thermal printer 1, and a case where the device information of the thermal printer 1 is stored in the device information file 113.

Figure 7:
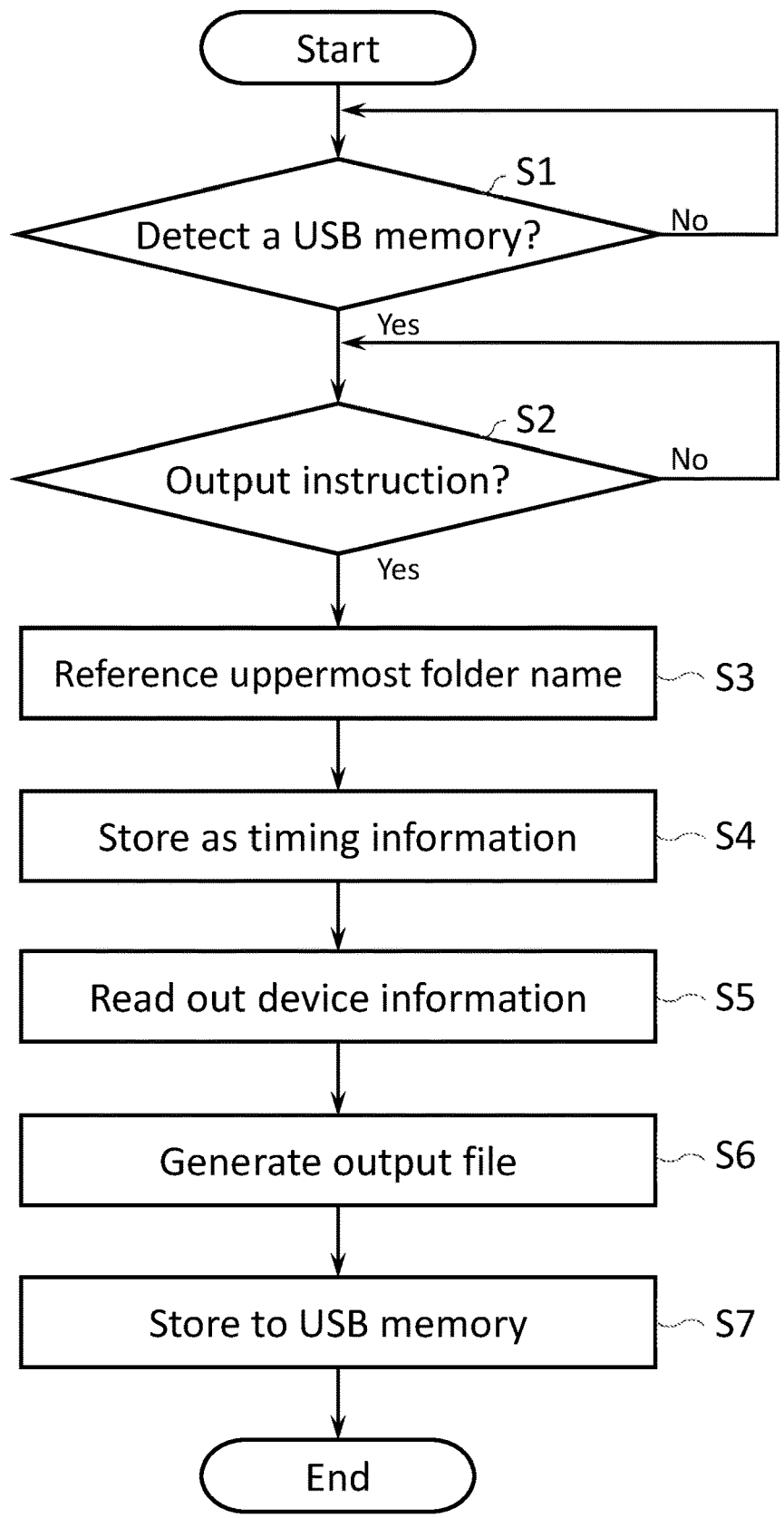
FIG. 7 is a flowchart showing processing of a control unit in an embodiment.

Next, an example of process for storing device information in the USB memory 100 will be described. FIG. 7 is a flowchart illustrating an example of process performed by the control unit 30.

The detection unit 301 determines whether the USB memory 100 is connected to the USB connection port 10 (S1), and when the USB memory 100 is not connected to the USB connection port 10 (No in S1), the control unit 30 returns to the process in S1 and waits. When the detection unit 301 detects the connection of the USB memory 100 (Yes in S1), the input unit 302 next determines whether an output instruction has been input from the operation unit 6 (S2), and when the output instruction is not input (No in S2), the control unit 30 returns to the process in S2.

When an output instruction is input to the input unit 302 (Yes in S2), the folder reference unit 303 refers to the folder name of the integrated folder 101, which is the uppermost folder in this example, of the USB memory 100 (S3). That is, the folder reference unit 303 accesses a storage area storing the folder name of the integrated folder 101, which is set in advance as a timing information storage area, and recognizes the folder name as timing information.

Subsequently, the acquisition unit 305 acquires the folder name of the integrated folder 101 as timing information and stores it in timing information section 331 of the RAM 33 (S4). The device information read unit 306 reads out the device information from the device information section 43 of the storage unit 40 (S5).

Next, the output information generation unit 307 generates an output file as output information (S6). The output file is a file storing the device information read out in S5 along with timing information (stored in S4) in association with the device information. Specifically, in this example, the timing information is stored as the generation time or update time of the output file.

The storage control unit 308 stores the generated output file in the USB memory 100 (S7). Specifically, the storage control unit 308 stores the output file in the device information file 113 of the USB memory 100 connected to the thermal printer 1. Then, the control unit 30 ends the process for storing the device information in the USB memory 100.

The user performing the maintenance can store the device information of the thermal printer 1 together with the timing information. The device information stored in the USB memory 100 can then be downloaded to a PC for analysis in order to analyze any error occurring in the thermal printer 1, for example. When device information is stored in the USB memory 100 from another thermal printer of the same model as the thermal printer 1, the stored device information can be stored in a separately prepared management PC or the like, and then the device information of the other thermal printer can be stored in the USB memory 100. In this case, the device information file 113 of the USB memory 100 is overwritten. Thus, the amount of data stored in the USB memory 100 is minimized, and it is possible to prevent the later acquired device information from being unable to be stored due to insufficient remaining storage capacity of the USB memory when writing the device information to the USB memory 100 connected to the thermal printer 1.

As described above, according to the thermal printer 1 of the present embodiment, even in a situation where the thermal printer and the storage medium connected to the thermal printer (or the device including the storage medium) do not include an internal clock function or the like, it is possible to write the information indicating the time when the device information was stored in the storage medium. Therefore, even in the above-described situation, the information indicating the time when the device information was written can be utilized for maintenance purposes. Furthermore, based on the timing information stored in the USB memory 100, it is possible to manage the acquired device information. Thus, it is possible to see the information regarding the print function of the thermal printer 1 in time series, and perform maintenance more effectively on such a basis. Although the timing information stored together with the device information does not completely coincide with the actual timing at which the device information was stored in the USB memory 100, the user can set the timing information within a necessary range in accordance with his/her own work.

MODIFICATION EXAMPLE

Figure 8:
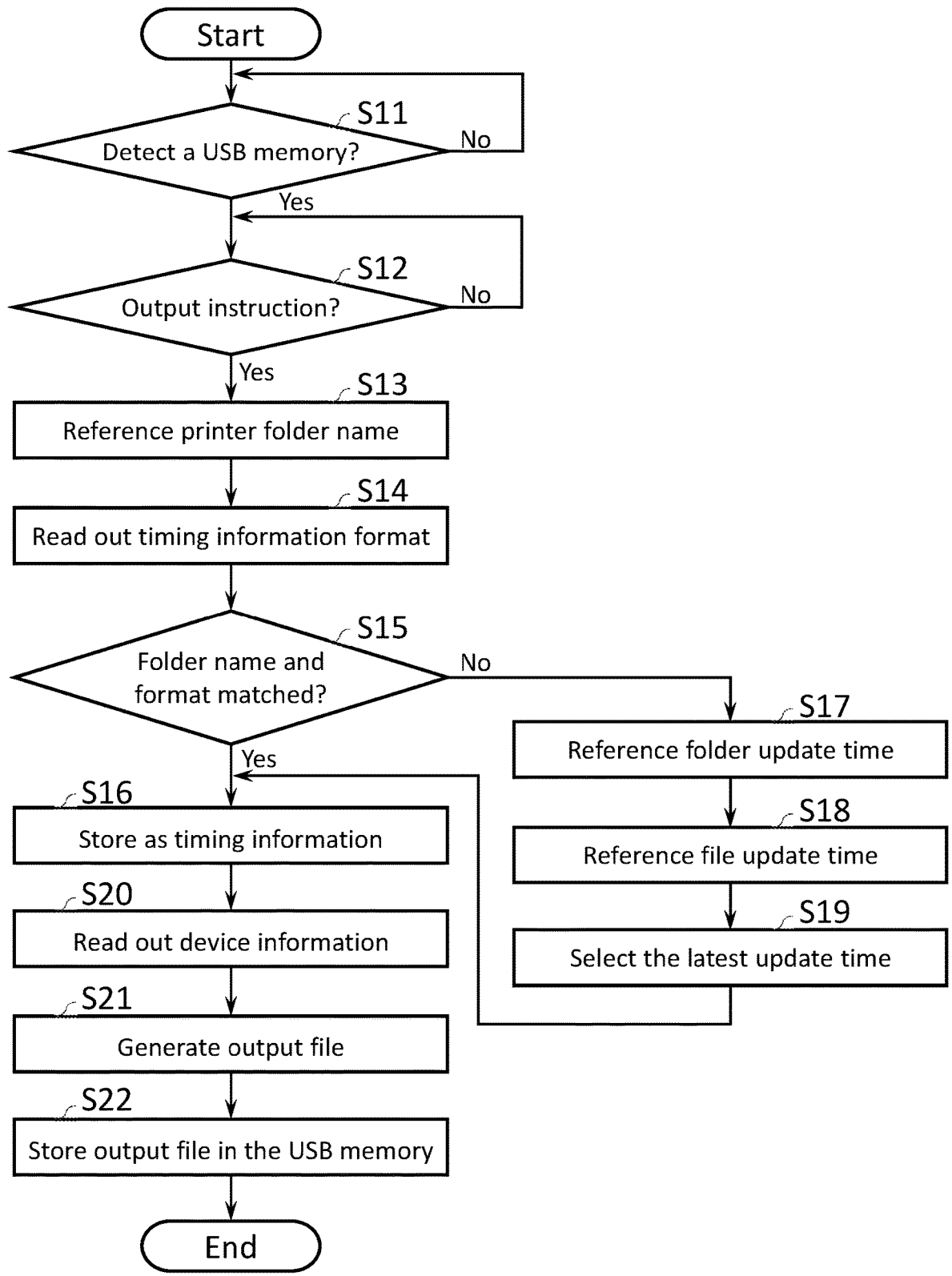
FIG. 8 is a flowchart showing processing of a control unit in a modification.

Next, a modification of the present embodiment will be described. FIG. 8 is a flowchart illustrating the process of the control unit 30 according to the modification. In the process in FIG. 7, it is assumed that timing information is stored in a correct format in a storage area set in advance as a timing information storage area. On the other hand, in the modification, it is possible to cope with a case where the user does not store the timing information in advance or a case where the timing information is attempted to be stored in a proper format but is not actually stored in the correct format.

The detection unit 301 determines whether the USB memory 100 is connected to the USB connection port 10 (S11), and when the USB memory 100 is not connected to the USB connection port 10 (No in S11), the control unit 30 returns to the process in S11 and waits. When the detection unit 301 detects the connection of the USB memory 100 (Yes in S11), the input unit 302 determines whether or not an output instruction has been input from the operation unit 6 (S12), and when the output instruction is not input (No in S12), the control unit 30 returns to the process in S12.

When an output instruction is input to the input unit 302 (Yes in S12), the folder reference unit 303 accesses the USB memory 100, refers to the folder name of the printer folder, and stores the folder name in RAM 33 (S13). In this example, it is assumed that the model of the thermal printer 1 is model A. The folder reference unit 303 refers to the folder name of the printer A folder 110. The area in which the folder name of the printer A folder 110 is stored is an example of a storage area set in advance as a timing information storage area.

Next, the folder reference unit 303 reads the timing information format from the timing information format section 44 (S14), and determines whether the format of the folder name of the printer A folder 110 matches the format of the timing information (S15). If there is a match (Yes in S15), the acquisition unit 305 acquires the folder name of the printer A folder 110 as timing information and stores it in the timing information section 331 of the RAM 33 (S16). That is, the folder reference unit 303 determines that the timing information that was written in the storage area set in advance as the timing information storage area by the user, and the acquisition unit 305 stores this as the timing information.

However, in S15, if the format of the folder name of the printer A folder 110 does not match the timing information format (No in S15), the folder reference unit 303 refers to the update time of the printer A folder 110 and stores it in RAM 33 (S17). Next, the file reference unit 304 refers to the update times of the firmware file 111 and the font file 112 in the printer A folder 110 and stores them in the RAM 33 (S18).

If the format of the folder name of the printer A folder 110 does not match the timing information format, it means that the timing information has not been written by the user or has been written but not in a correct format. In this case, in the modification example, when the printer A folder 110, the firmware file 111, and the font file 112 are updated, the update time automatically recorded by the PC or the like is handled as the timing information. Therefore, even when the timing information is not correctly written by the user, the timing information can still be acquired.

Subsequently, the acquisition unit 305 selects the latest update time from the update times of the printer A folder 110, the firmware file 111, and the font file 112 stored in RAM 33 (S19), and the control unit 30 proceeds to process in S16. That is, the acquisition unit 305 stores the latest update time as timing information in the timing information section 331. After process of S16, the device information read unit 306 reads device information from the device information section 43 of the storage unit 40 (S20).

Next, the output information generation unit 307 generates an output file as output information (S21). The output file is a file storing device information read in S20, and timing information stored in S16 is stored in association with the device information. Specifically, the timing information is recorded as the generation time or update time of the output file.

The storage control unit 308 stores the output file generated by the output information generation unit 307 in S21 (S22). Specifically, the storage control unit 308 stores the output file in the device information file 113 of the USB memory 100 connected to the thermal printer 1. Then, the control unit 30 ends the process for storing the device information in the USB memory 100.

As described above, according to the above modification, even when the timing information is not stored in the predetermined area of the USB memory 100 in the correct format by the user, it is possible to write the time information along with the device information when the device information is stored in the USB memory 100. The time information stored together with the device information does not completely coincide with the actual time at which the device information was stored in the USB memory 100. However, normally, before the USB memory 100 is connected to the thermal printer 1, a folder or file in the USB memory 100 is updated in some way relatively recently before the maintenance operation, thereby, the timing information to be written can still be said to be information related to the time when the device information was stored.

In the above modification example, when the timing information is not stored in the correct format in the storage area set in advance as the timing information storage area, the acquisition unit 305 acquires the update time of the folder or the file in the USB memory 100 as the timing information. However, the storage area set in advance as the timing information storage area may not be provided at all in some cases. In this case, the acquisition unit 305 may acquire the update time of the folder or file in the USB memory 100 as the timing information without the reference unit 303 referring to the folder name of the printer A folder 110.

In the above embodiment, the control program executed by the thermal printer 1 may be provided by being recorded in a non-transitory computer-readable recording medium such as a CD-ROM. The control program executed by the thermal printer 1 according to the above embodiment may be stored in a computer connected to a network such as the Internet and provided by being downloaded via a network, or may be provided via a network such as the Internet.

The storage medium to be connected to the thermal printer 1 is not limited to a USB memory device and in general any connectable storage device may be utilized in a similar manner as USB memory 100. Furthermore, in the above embodiment, the timing information stored together with the device information is information indicating time in increments of seconds, but the present disclosure is not limited thereto, and the user can arbitrarily set the timing information within a necessary range or at an arbitrary unit scale.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer lacking an internal clock, the printer comprising:
   a printer unit configured to print images on paper;
   a connector connectable to a detachable storage medium; and
   a controller configured to:
      acquire time information from the storage medium when the storage medium is connected to connector, and
      store output information in the storage medium, the output information including device information related to a print function of the printer unit and the acquired timing information in association with each other, wherein
   the controller is configured to attempt to acquire the time information from a predetermined storage area of the storage medium and, if the attempt is unsuccessful, attempt to acquire the time information as an update time of one of a folder or a file stored in the storage medium.

2. The printer according to claim 1, wherein the connector is a universal serial bus-type connector.

3. The printer according to claim 1, wherein the printer unit comprises a thermal printhead.

4. The printer according to claim 1, wherein, when a plurality of different update times are available for folders and files stored in the storage medium, the controller is configured to select the most recent update time in the plurality of update times as the time information.

5. The printer according to claim 1, wherein the device information includes an operation log for the printer unit.

6. A receipt printer lacking an internal clock, the receipt printer comprising:
   a thermal printer unit configured to print transaction information received from a point-of-sale terminal on paper;
   a USB connector connectable to a detachable USB memory drive; and
   a controller configured to:
      acquire time information from the USB memory drive when the USB memory drive is connected to USB connector, and
      store output information in the USB memory drive, the output information including device information related to a print function of the thermal printer unit and the acquired timing information in association with each other, wherein
   the controller is configured to attempt to acquire the time information from a predetermined storage area of the USB memory drive and, if the attempt is unsuccessful, attempt to acquire the time information as an update time of one of a folder or a file stored in the USB memory drive.

7. The receipt printer according to claim 6, wherein, when a plurality of different update times are available for folders and files stored in the USB memory drive, the controller is configured to select the most recent update time in the plurality of update times as the time information.

8. The receipt printer according to claim 6, wherein the device information includes an operation log for the thermal printer unit.

9. A method of acquiring maintenance information in association with time information from a printer lacking an internal clock, the method comprising:
   connecting a detachable storage medium to a connector of a printer;
   attempting to acquire time information from a predetermined storage area of the storage medium when the storage medium is connected to connector, and if the attempt is unsuccessful, attempting to acquire the time information as an update time of one of a folder or a file stored in the storage medium; and
   storing output information in the storage medium, the output information including device information related to a print function of the printer and the acquired timing information in association with each other.

10. The method according to claim 9, wherein the storage medium is a universal serial bus (USB) memory drive.

11. The method according to claim 9, wherein the storage medium lacks an internal clock.

12. The method according to claim 9, wherein, when a plurality of different update times are available for folders and files stored in the storage medium, the most recent update time in the plurality of update times is selected as the time information.

13. The method according to claim 9, wherein the printer is a thermal printer.

14. The method according to claim 9, wherein the device information includes an operation log for the printer.

* * * * *